Figure 1:
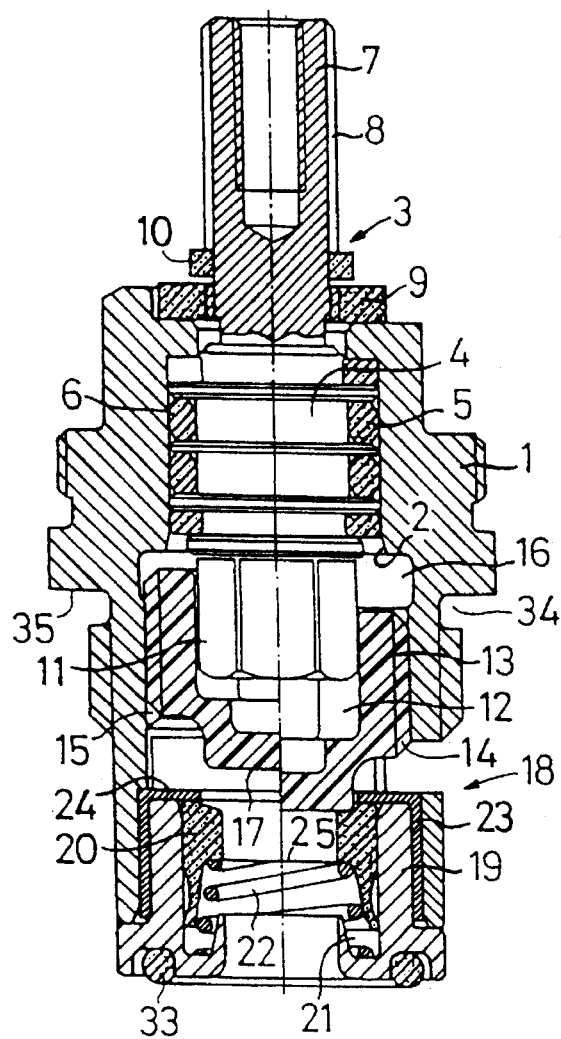

United States Patent

Lorch

Patent Number: 5,580,031
Date of Patent: Dec. 3, 1996

[54] STOP VALVE

[75] Inventor: Werner Lorch, Schramberg, Germany

[73] Assignee: Hans Grohe GmbH & Co. KG, Germany

[21] Appl. No.: 185,841

[22] PCT Filed: May 20, 1993

[86] PCT No.: PCT/EP93/01254

§ 371 Date: Jan. 21, 1994

§ 102(e) Date: Jan. 21, 1994

[87] PCT Pub. No.: WO93/24774

PCT Pub. Date: Dec. 9, 1993

[30] Foreign Application Priority Data

May 22, 1992 [DE] Germany ............... 42 17 006.0

[51] Int. Cl.⁶ .................. F16K 25/00; F16K 31/50
[52] U.S. Cl. .................. 251/174; 137/454.5; 251/266; 251/267; 251/268; 251/359; 251/364
[58] Field of Search .................. 137/454.2, 454.5, 137/454.6; 251/266, 267, 268, 269, 270, 359, 360, 362, 363, 364, 174

[56] References Cited

U.S. PATENT DOCUMENTS

| 969,803 | 9/1910 | Pollock | 137/614.11 |
|---|---|---|---|
| 3,006,361 | 10/1961 | Reinemann | 137/454.5 |
| 3,583,426 | 6/1971 | Feres | 251/174 |
| 3,633,870 | 1/1972 | Bayer | 251/270 |
| 3,913,612 | 10/1975 | Tolnai | 137/454.6 |
| 3,923,283 | 12/1975 | Tomiati | 251/77 |
| 3,960,364 | 6/1976 | Hargrave | 251/332 |
| 4,064,904 | 12/1977 | Tolnai | 137/454.5 |
| 4,077,426 | 3/1978 | Karie | 137/454.6 |
| 4,109,672 | 8/1978 | Szemeredi | 137/454.2 |
| 4,175,586 | 11/1979 | Hayman | 137/454.6 |
| 4,226,260 | 10/1980 | Schmitt | 137/454.6 |
| 4,468,001 | 8/1984 | Stanic | 137/454.5 |
| 4,478,249 | 10/1984 | Fleischmann | 137/454.6 |
| 4,493,338 | 1/1985 | Petursson | 251/267 |
| 4,610,268 | 9/1986 | Knapp | 137/454.6 |
| 4,700,928 | 10/1987 | Marty | 137/454.6 |
| 4,773,442 | 9/1988 | Lephilibert | 251/362 |
| 4,778,149 | 10/1988 | Pesovic et al. | 251/268 |
| 4,815,699 | 3/1989 | Mueller | 251/174 |
| 4,838,304 | 6/1989 | Knapp | 137/454.6 |
| 5,111,842 | 5/1992 | Knapp | 137/454.6 |

FOREIGN PATENT DOCUMENTS

| 2390656 | 12/1978 | France . | |
|---|---|---|---|
| 235072 | 3/1910 | Germany . | |
| 2428242 | 1/1975 | Germany . | |
| 2534316 | 7/1975 | Germany | 251/362 |
| 2737839 | 3/1979 | Germany . | |
| 2938315 | 4/1980 | Germany . | |
| 544524 | 4/1942 | United Kingdom . | |

Primary Examiner—George L. Walton
Attorney, Agent, or Firm—Eckert Seamans Cherin & Mellott

[57] ABSTRACT

A stop valve which is in particular constructed as a valve top for a sanitary fitting, contains an actuating member constructed as a rotary spindle. The actuating member, which is held in axially non-displaceable manner, engages with a hexagonal neck in a closing body, whose external thread engages in an internal thread of the valve top. The closing body has a closing face cooperating with a valve seat. The valve seat is displaceable to a limited extent in the axial direction and contains a rubber-elastic member.

19 Claims, 1 Drawing Sheet

STOP VALVE

DESCRIPTION

The invention relates to a stop valve more particularly constructed as a valve top for use in sanitary fittings.

A valve top for sanitary fittings is already known (DE-OS 27 37 839), in which an axially movable closing body provided with a rubber-like packing or gasket, is movable towards an annular valve seat body. An operator can turn the actuating member until he thinks that the valve is closed. He can therefore give rise to inadmissibly high pressures, which lead to premature valve wear.

A stop valve is also known (German patent 29 38 315), in which the sealing body has a rubber disk fixed between two metal parts, the sealing body cooperating with a conical valve seat. On excessively tightening the valve metal parts engage with one another, so that there is no overstressing of the rubber disk. However, the valve has a very complicated and costly construction.

In addition, a stop and regulating valve is known (German patent 24 28 242), in which the sealing member located at one end of a spindle has an elastic packing positioned between two disks. The valve seat is also conical. Actuation is limited in that the metallic front face of the actuating member engages with the metallic valve seat. As the front face only engages linearly on the conical valve seat, the latter can be damaged.

The problem of the invention is to provide a stop valve, particularly for use in sanitary fittings, which is in the form of a valve top, which can be simply constructed from a few operating parts and is subject to limited wear.

With the stop valve proposed by the invention it is possible with simple means for the forces acting on the valve seat to be limited, so that the valve is subject to limited wear and consequently has a long life. The resilience of the valve seat compared with the closing body cooperating therewith for closing the valve ensures that the surface pressure remains low.

According to a further development of the invention the valve seat has a rubber-elastic material sleeve on which acts a spring. This sleeve forms in the vicinity of its front face facing the closing body the sealing face for the valve seat. Advantageously the sleeve is held in its position facing the closing body by a stop member engaging thereon. According to the invention the stop member can act on the actuating member.

The invention proposes that the movement path of the closing body limited by the stop member is made such that the movement path extends somewhat further than up to the closing body-side end position of the valve seat. Thus, when the valve is in the closed position an engagement of the closing body on the valve seat always takes place under the action of the latter and can in particular be provided by a spring, which engages on the valve seat and/or the sleeve.

In the case of the valve proposed by the invention the closing body is part of the actuating member, i.e. is constructed in one piece therewith. However, it is also advantageously possible according to the invention for the closing body to be a component separate from the actuating member. It is therefore possible to make the closing body from less expensive material, e.g. to injection mould it in one piece from plastic. The mechanical movement and guidance of the closing body can then be carried out by metallic components.

The invention proposes that the actuating member be constructed as a rotary spindle. It can be a conventional rotary spindle in which, due to a thread engagement during each rotation, simultaneously a longitudinal movement also takes place. However, it is also possible to form the actuating member by an axially, non-moving rotary element.

As proposed by the invention, the closing body need only be guided in axially movable manner, so that there is no rotation during a longitudinal movement. Thus, in the case of engagement between the closing body and the valve seat, there is then no relative movement in the circumferential direction, which can contribute to an increased life.

It is also possible to allow a relative movement in the circumferential direction and to use sane for stripping off deposits of lime and/or other impurities.

For the movement of the closing body it can engage with a thread in the top housing of the stop valve. However, it is also possible that it engages with a thread in a thread of the actuating member and is consequently axially moved. It can advantageously be a multi-start and in particular a two-start thread.

The invention proposes that the sealing sleeve be held in a housing, which is optionally usable as a replaceable part in the stop valve. It is in particular possible to construct said housing in two parts and to press it into the top housing.

The invention proposes that the stop member is in particular provided in one piece manner on the valve top. With said housing-side stop member can cooperate a stop counter element of the actuating member, which is preferably constructed as an angularly adjustable stop ring. The part of the actuating member to which the handle is fixed, frequently has a gear-shaped cross-section. It is consequently possible to provide the stop ring with an identical tooth arrangement, so that it can be fixed in several positions.

According to the invention the stop valve is constructed as a complete component for use in fittings having standard dimensions.

Further features, details and advantages of the invention can be gathered from the following description of preferred embodiments with reference to the attached drawings, wherein show:

FIG. 1 A longitudinal section through a stop valve constructed as a valve top in accordance with the invention.

Figure 2:
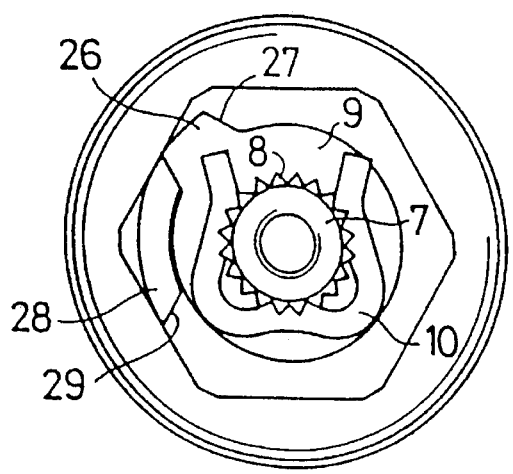

FIG. 2 A plan view of the valve top of FIG. 1.

Figure 3:
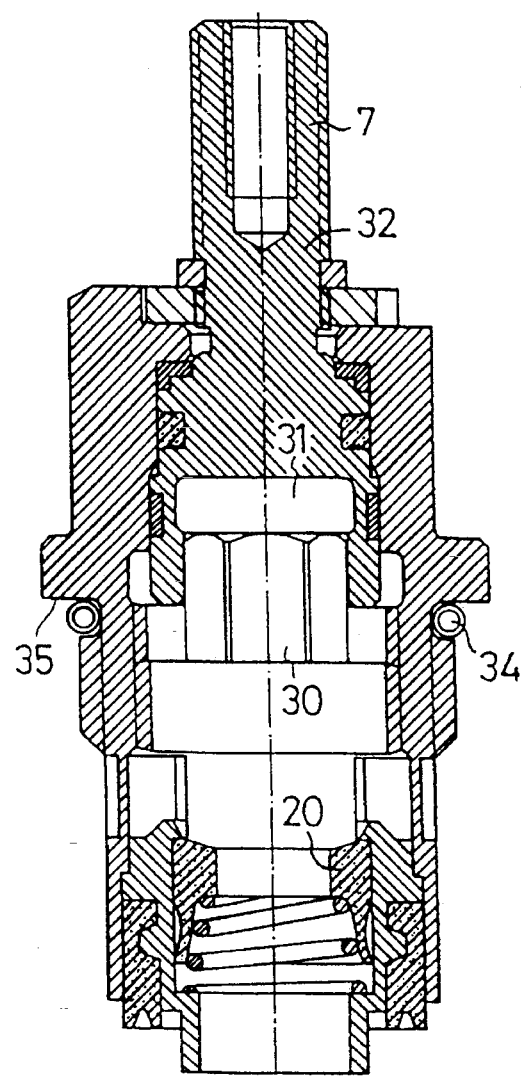

FIG. 3 A longitudinal section corresponding to FIG. 1 of a second embodiment.

As stated, the stop valve according to the invention is constructed in the represented embodiments as a valve top for use in a sanitary fitting and in particular a fitting having standard dimensions. The valve top contains a housing 1, which is used for retaining the different components and with which the stop valve can be screwed into a sanitary fitting. The housing contains a bearing bore 2 for an actuating member 3, which is constructed in the represented embodiment as a rotary spindle. The rotary spindle contains a central portion 4 with several radially arranged, all-round flanges 5, between which are formed grooves for housing ring gaskets 6. The external diameter of the flanges 5 is slightly smaller than the internal diameter of the bearing bore 2. To the central portion 5 is connected, in the direction of the outside of the housing 1, an actuating portion 7, whose outside is provided with a tooth system 8. In said tooth system 8 engages a stop ring 9, which simultaneously axially fixes the actuating member 3. A retaining clip 10 secures the stop ring 9.

In the vicinity of its end directed into the interior of the housing 1, the actuating member 3 is provided with a hexagonal neck 11 with which the actuating member 3 engages in a cross-sectionally hexagonal internal recess 12 of a closing body 13. The closing body 13 is provided on its outside with a thread 14, with which it engages in an internal thread 15 of the inner area 16 of the housing 1. A rotation of the closing body 13 simultaneously also axially moves it. In the vicinity of its end directed away from the actuating member 3, the closing body has a planar closing surface 17 with a rounded edge. In place of a hexagonal construction it would also be possible to use another shape ensuring a rotary connection.

Facing the closing body 13 a valve seat 18 is formed on the lower end of the housing 1 in FIG. 1. The valve seat 18 contains a cylindrical bush 19 within which is placed the rubber-elastic sleeve 20. The bush 19 contains an all-round groove 21, which is open in the axial direction of the bush 19 and in which is supported one end of a compression spring 22. The opposite end of the compression spring 22 acts on the sleeve 20 on a shoulder 23 and forces it in the direction of the closing body 13. This displacement of the sleeve 20 brought about by the spring 22 is limited by the engagement of the sleeve 20 against a cup-shaped sleeve holder 23. The cup-shaped sleeve holder 23 with an opening 25, located in its bottom 24, which is somewhat larger than the diameter of the closing surface 17, is pressed over the bush 19, so that the bush 19 and the sleeve holder 23 together form a two-part housing for the sleeve 20. This housing is then also pressed into the front opening of the inner area 16 of the housing 1. The sleeve holder 23 can advantageously be provided with a corrugated circumference.

The water flows from the bottom in FIG. 1 and axially into the housing 1. For opening and closing the valve the actuating member 3 is turned, the rotary movement of the actuating member being transferred by the hexagonal neck 11 to the closing body 13, which turns in the thread 14, 15 and is consequently axially moved. From the open position of the valve shown to the left in FIG. 1, the closing body 13 passes into the right-hand closed position, the closing surface 19 in its circumferential area engaging on the slightly conically constructed front face of the sleeve 20. On further rotating the actuating member 3 the sleeve 20 can be axially retracted, so that an excessive surface pressure and therefore wear is avoided.

In a plan view of the arrangement according to FIG. 1, FIG. 2 shows the stop ring 9, which is mounted on the actuating portion 7 provided with the tooth system 8. The inner opening of the stop ring 9 has a tooth system corresponding to the tooth system 8, so that the stop ring 9 is fixed in non-rotary manner. The stop ring has a projection 26 with two circumferentially directed surfaces 27.

On the top of the housing 1 is constructed in one piece a stop member 28, which also has two circumferentially directed surfaces 29. The projection 26 of the stop ring 9 forms a stop counterface for the fixed stop member 28, so that the rotation of the actuating member 3 is limited. To this limitation of the rotary movement corresponds a limitation of the advance movement of the closing body 13, the stop ring 9 being fitted in such a way that a closing movement of the closing body extends somewhat further than the contacting of the valve seat by the closing face 17. For correct setting purposes it is possible to remove the stop ring 9 and displace it by an angle corresponding to a multiple of a tooth spacing. The approximately U-shaped retaining clip 10 secures the stop ring and engages in an annular groove in the tooth system positioned transversely to the longitudinal direction and remains locked there due to its leg shape.

FIG. 3 shows an embodiment in which, apart from a different mounting of the actuating member 3, the closing body has a somewhat different construction. Instead of having a hexagonal depression 12, it has a hexagonal neck 30, which engages in a hexagonal depression 31 of the actuating member 32. However, the movement of the closing body 13 is brought about in the same way as in the embodiment of FIG. 1.

The sealing sleeve 20 has a somewhat different mounting support, but is otherwise guided and constructed in the same way.

In the vicinity of their sides remote from the actuating portion 7, each of the embodiments has a gasket 33, which is used for sealing the valve top with respect to a sanitary fitting. A further groove 34 is positioned close to a shoulder 35 with which the valve top housing 1 engages with the sanitary fitting.

Whereas in the represented embodiments the actuating member 3 is constructed as an axially non-movable rotary spindle and the closing body 13 as an axially and rotary movable member, it is also obviously possible to have the closing body 13 engage by means of a thread on its inside in a corresponding thread of the actuating member 3 and prevent its outside from rotating. In this case the closing body would only move axially.

It is also possible to construct the actuating member as a rotary spindle guided by a thread and in this case the longitudinal movement of the closing body could take place by a direct driving of the actuating member or also by an axial guide.

The represented embodiment has the advantage that it is possible to manufacture the closing body 13 as a separate component, i.e. for example inexpensively manufacture it from plastic.

I claim:

1. A stop valve for use in sanitary fittings, particularly as a valve top, comprising:

a rotary actuating member, a closing body, movable linearly by rotation of the actuating member on an axis, a stop member limiting movement of the closing body to an end position of the closing body when the valve is closed, linearly displaceable means biasing a valve seat toward the closing body, the linearly displaceable means guiding movement of the valve seat to a limited extent towards and away from the closing body along the axis and the valve seat comprising a rubber-elastic material, the linearly displaceable means urging the valve seat to an advanced position when the valve is open, the advanced position being beyond said end position of the closing body when the valve is closed, and, a valve housing for housing the actuating member, the closing body, the linearly displaceable means and the valve seat, said valve housing having a holder portion with axially spaced means for retaining and limiting movement of the valve seat in a direction toward the closing body at said advanced position, the holder portion retaining the linearly displaceable means in a direction away from the closing body and retaining the valve seat in a direction toward the closing body, thereby defining a range of positions of the valve seat, whereby the closing body and the valve seat can come into closing engagement without substantially deforming the valve seat, at any point in the range of positions to which the linearly displaceable means advances the valve seat toward the closing body.

2. A stop valve according to claim 1, wherein the linearly displaceable means defining the valve seat comprises a rubber-elastic material sleeve urged towards the closing body by a spring.

3. A stop valve according to claim 1, wherein the stop member acts on the actuating member.

4. A stop valve according to claim 1, wherein the closing body is a component separate from the actuating member.

5. A stop valve according to claim 1, wherein the closing body is made from plastic.

6. A stop valve according to claim 1, wherein the actuating member has a rotary spindle.

7. A stop valve according to claim 1, wherein the actuating member is formed by an axially non-movable rotary element.

8. A stop valve according to claim 1, wherein the closing body is guided in such a way that it can only move axially.

9. A stop valve according to claim 2, wherein the sleeve is held in a housing insertable in the stop valve.

10. A stop valve according to claim 9, wherein the housing is constructed as a bush and forms a standard component with the sleeve, the spring and the sleeve holder.

11. A stop valve according to claim 10 wherein the standard component is pressed from below into the valve housing.

12. A stop valve according to claim 1, wherein the closing body is moved axially by means of a thread in the top housing.

13. A stop valve according to claim 1, wherein the closing body is moved axially by means of a thread on the actuating member.

14. A stop valve according to claim 1, wherein the stop member is constructed on the valve top.

15. A stop valve according to claim 1, wherein a stop countermember is located on the actuating member.

16. A stop valve according to claim 15, wherein the stop countermember is constructed on an angularly adjustable stop ring.

17. A stop valve according to claim 1, wherein said stop valve is constructed as a complete standard unit for use in sanitary fittings having standard dimensions.

18. A valve for use in sanitary fittings, comprising:

a rotary actuating member coupled to a closing body, the closing body being advanced and retracted linearly in opposite directions by rotation of the actuating member on an axis, linearly displaceable means biasing a valve seat toward the closing body, the linearly displaceable means guiding movement of the valve seat to a limited extent towards and away from the closing body along the axis, the valve seat comprising a rubber-elastic material urged by the linearly displaceable means from a first position at which pressure from the closing body against the valve seat closes the valve, and a second position in which the closing body is spaced from the valve seat to open the valve, and, a valve housing for housing the actuating member, the closing body, the linearly displaceable means and the valve seat, said valve housing having a holder portion with axially spaced means for retaining and limiting movement of the valve seat in a direction toward the closing body at said advanced position, the holder portion retaining the linearly displaceable means in a direction away from the closing body and retaining the valve seat in a direction toward the closing body, thereby defining a range of positions of the valve seat, whereby the closing body and the valve seat can come into closing engagement without substantially deforming the valve seat, at any point in the range of positions to which the linearly displaceable means advances the valve seat toward the closing body.

19. A valve according to claim 18, further comprising a stop operable to limit advance of the closing member to a predetermined end position, and wherein the linearly displaceable means comprises a spring biased to urge the valve seat in a direction toward the closing body.

* * * * *